(No Model.) 5 Sheets—Sheet 1.

A. J. MARTIN.
TRACTION ENGINE.

No. 578,888. Patented Mar. 16, 1897.

WITNESSES:
Arthur Ashley

INVENTOR
A. J. Martin
BY
Philip T. Dodge
ATTORNEY.

(No Model.)

A. J. MARTIN.
TRACTION ENGINE.

No. 578,888. Patented Mar. 16, 1897.

On line a-a

On line b-b

On line c-c

WITNESSES:

INVENTOR
A. J. Martin
BY
Philip T. Dodge
ATTORNEY.

(No Model.)
A. J. MARTIN.
TRACTION ENGINE.
No. 578,888.
5 Sheets—Sheet 4.
Patented Mar. 16, 1897.
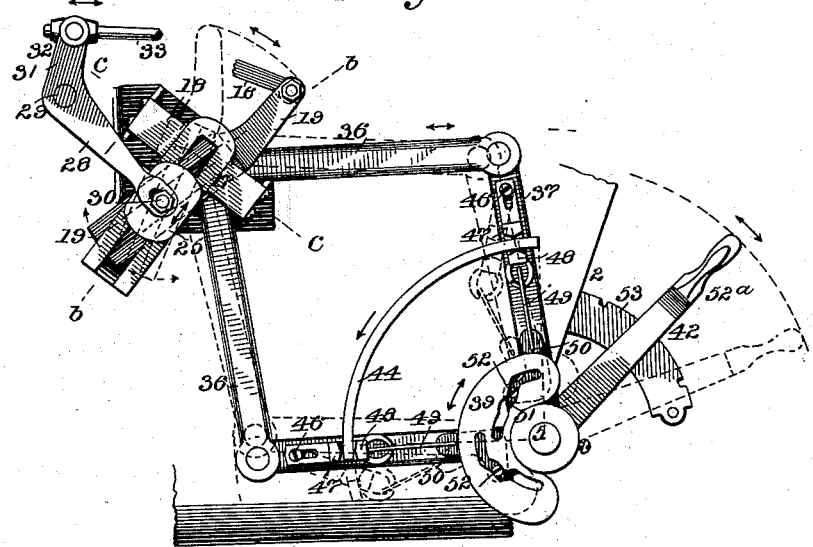
Fig. 6.
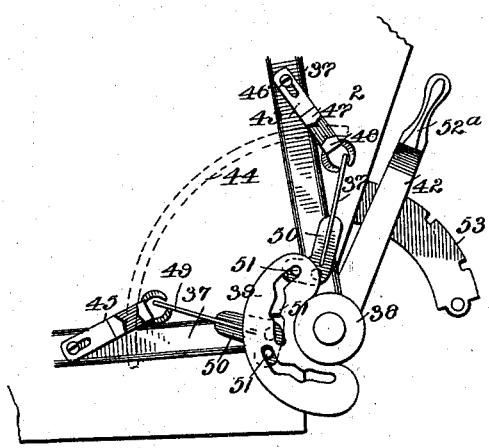
Fig. 7.
Fig. 8.
WITNESSES:
Arthur Ashley
INVENTOR
A. J. Martin
BY
ATTORNEY.

(No Model.)  A. J. MARTIN.  5 Sheets—Sheet 5.
TRACTION ENGINE.
No. 578,888.   Patented Mar. 16, 1897.
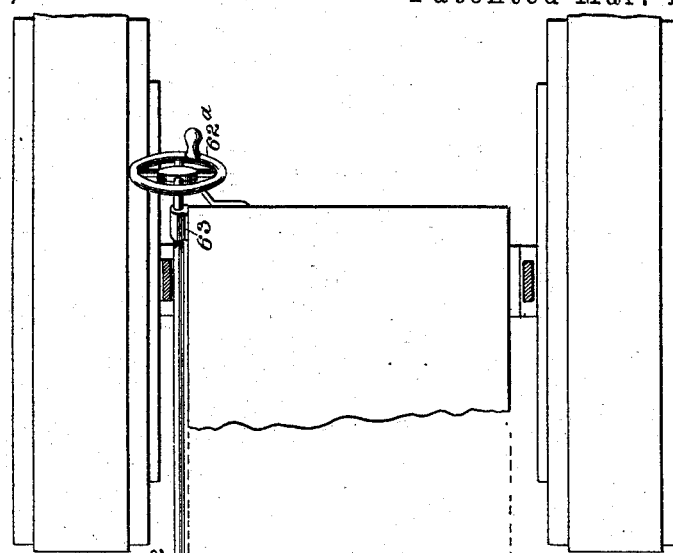
Fig. 9.
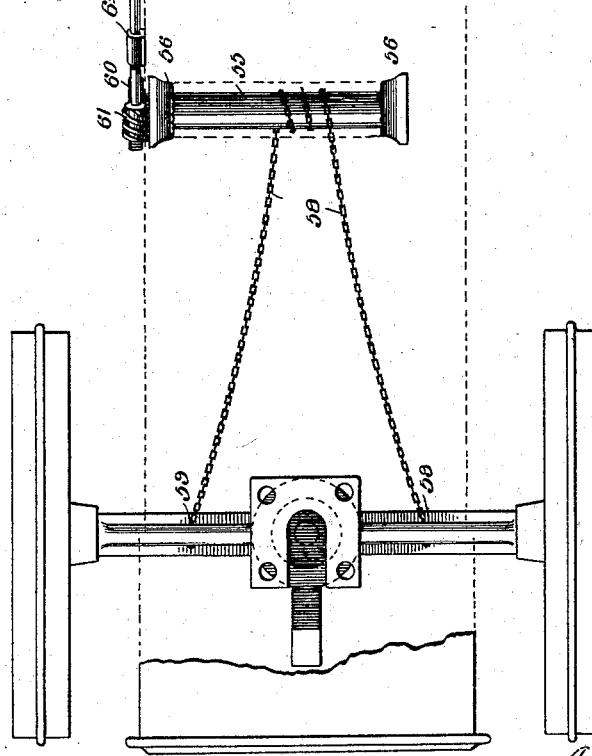
Witnesses  Inventor

UNITED STATES PATENT OFFICE.

ANDREW J. MARTIN, OF BUFFALO, NEW YORK.

TRACTION-ENGINE.

SPECIFICATION forming part of Letters Patent No. 578,888, dated March 16, 1897.

Application filed March 11, 1896. Serial No. 582,752. (No model.)

*To all whom it may concern:*

Be it known that I, ANDREW J. MARTIN, of Buffalo, county of Erie, and State of New York, have invented a new and useful Improvement in Traction-Engines, of which the following is a specification.

This invention has reference to traction-engines; and it consists of various improvements relating particularly to the mechanism for driving the traction-wheels, to mechanism for varying the speed of the advance of the engine, to mechanism for bringing the engine to a rest, to mechanism for reversing its travel, to mechanism for controlling the direction of its movement, and to various other mechanisms, which will be more fully described hereinafter.

Figure 1:
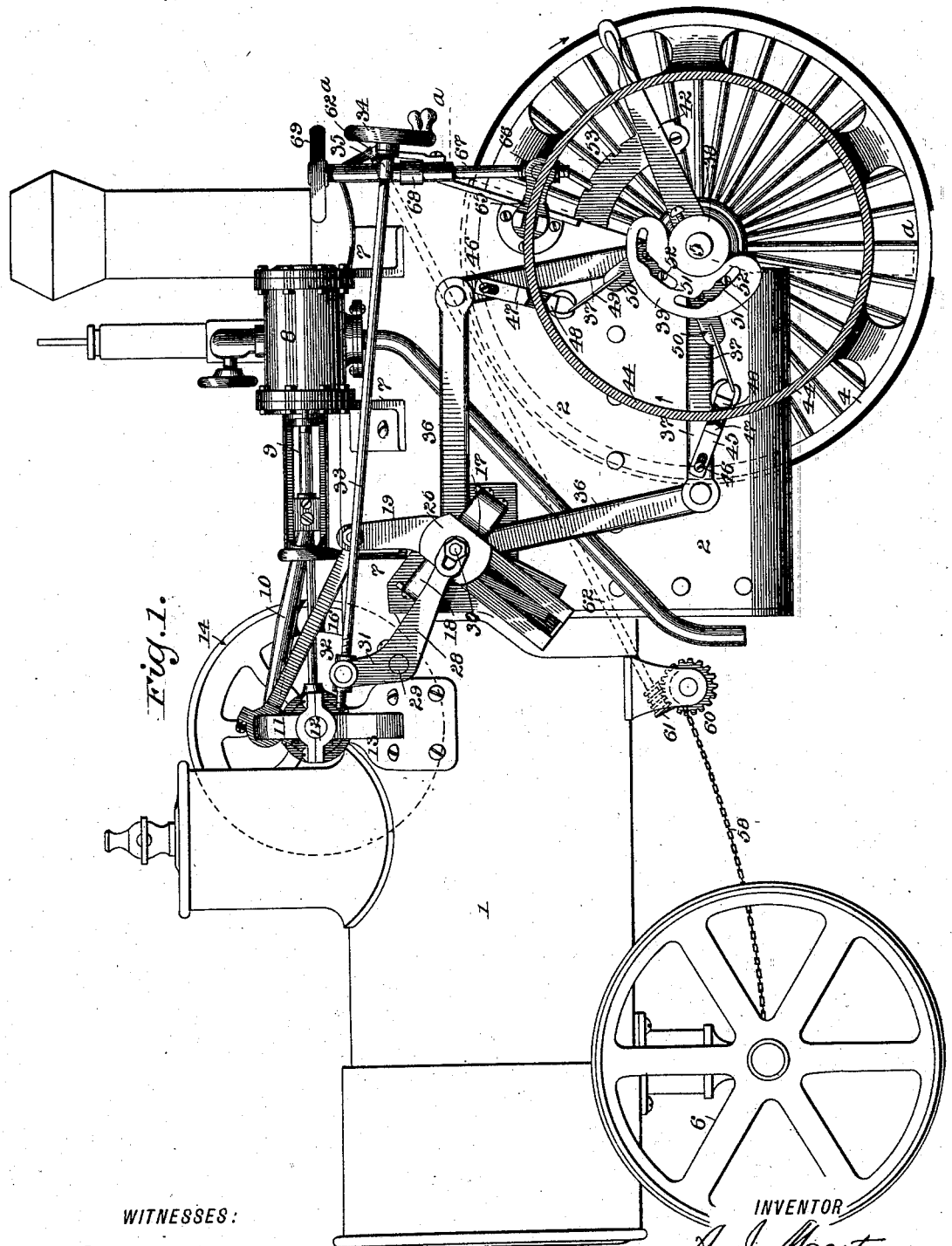
Figure 2:
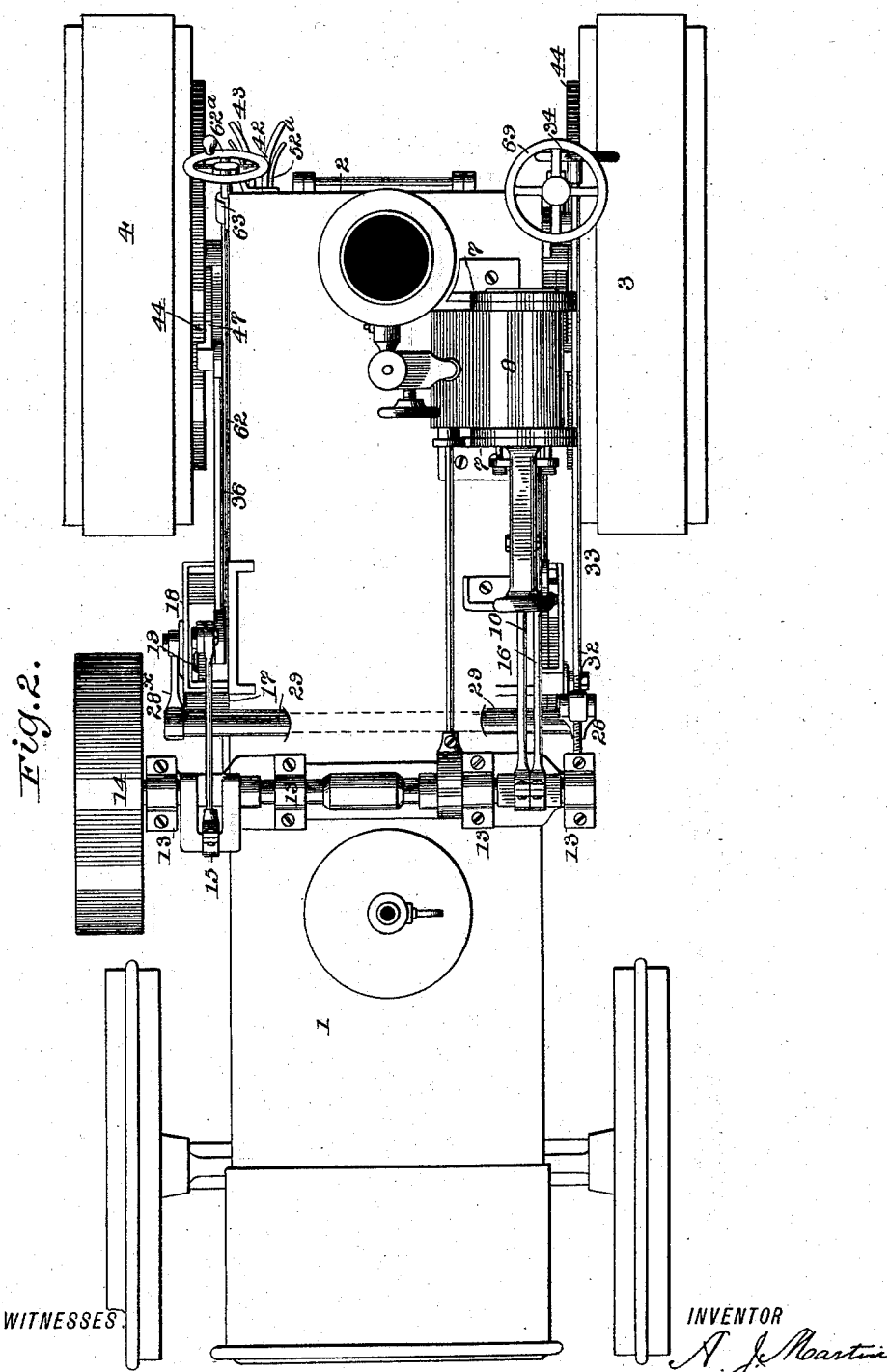
Figure 3:
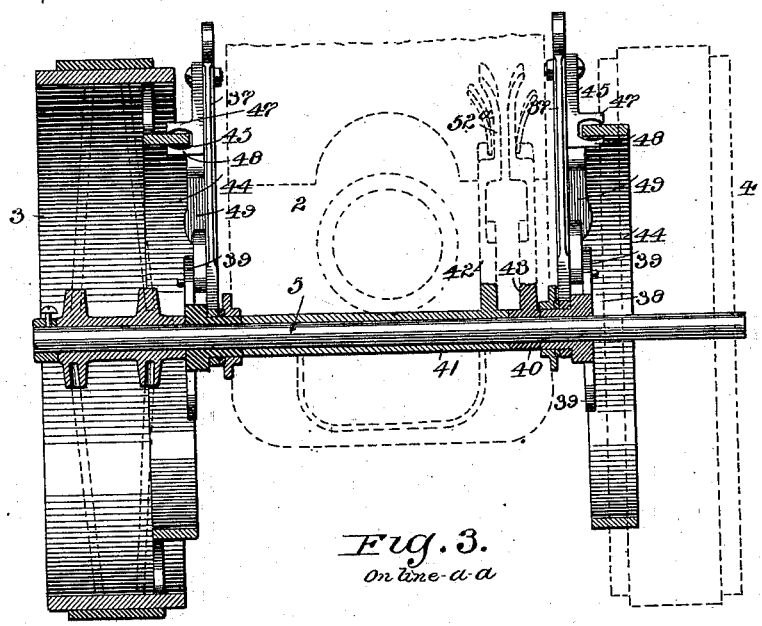
Figure 4:
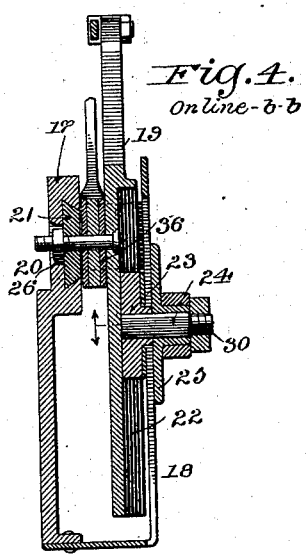
Figure 5:
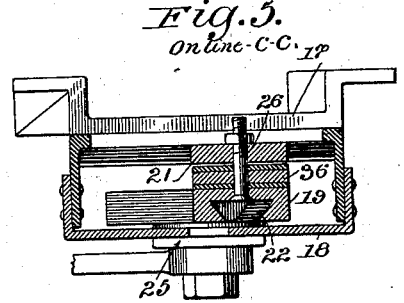

In the accompanying drawings, Figure 1 is a side elevation of my improved engine, a part of the near wheel being removed to expose other parts of the mechanism to view. Fig. 2 is a top plan view of the same. Fig. 3 is a vertical transverse section on the line $a\,a$ of Fig. 1. Fig. 4 is a section on the line $b\,b$ of Fig. 6. Fig. 5 is a section on the line $c\,c$ of Fig. 6. Fig. 6 is a side elevation of the mechanism for driving the traction-wheels. Fig. 7 is a similar view with the parts in a different position. Fig. 8 is a perspective view of the cam for adjusting the driving-dogs. Fig. 9 is an outline view of the guiding mechanism.

Referring to the drawings, 1 represents a horizontal boiler having at its front end a furnace 2, which parts are sustained at the front by two traction-wheels 3 and 4, mounted on a horizontal transverse shaft or axle 5, connected to the furnace-front and at their rear by a swiveling truck 6. At its front the boiler-casing has fixed to it at one side by means of brackets 7 an engine-cylinder 8, containing the usual piston and a rearwardly-extending piston-rod 9, which is connected by a pitman 10 to a crank 11 on an engine or crank shaft 12. This shaft extends transversely along the top of the boiler and is mounted at its ends in suitable bearings 13, rising from a saddle-plate embracing the upper part of the boiler and fixed securely thereto. At one end the crank-shaft is provided with a band or balance wheel 14, which may be belted to the thresher or other mechanism to be driven, and adjacent to the balance-wheel the shaft is provided with a crank 15, disposed at an angle to the other crank referred to, and these cranks are connected by pitmen 16 to the mechanisms for driving the traction-wheels. These mechanisms are the same on both sides of the machine. Hence the description of one will suffice for both.

Fixed to the side of the boiler is a T-shaped frame comprising a diagonally - extending slotted base-piece 17, to which is connected, a slight distance above it, a slotted plate 18, extending from the center of the base-piece and at right angles to the same, as plainly shown in Figs. 4 and 5. Extending between these two slotted plates is a rocking lever 19, having its upper end jointed to the pitman 16, before alluded to.

The lever is provided about midway of its length with an inwardly-extending bolt 20, carrying a plate 21, mounted to reciprocate in the slot in the base-plate, the plate and slot being dovetailed, as shown, to prevent their separation. In its outer side the lever is formed with a longitudinally-extending dovetail groove 22, in which extends a correspondingly-formed fulcrum-block 23, mounted loosely on a laterally-extending journal 24, projecting through the slot in the plate 18, and connected to a plate 25, seated against the outer face of the plate 18. The journal 24 constitutes the fulcrum on which the lever turns when rocked by the rotation of the crank-shaft, and this fulcrum is made movable along the slot in the plate 18 in order to vary the stroke or throw of the lever at the point where the bolt 26 is connected to it and where the mechanism for driving the traction-wheels is jointed, as will be more fully described hereinafter. The movement of the fulcrum-blocks on the opposite sides of the machine is effected simultaneously by arms 28 and $28^\times$, fixed to the ends of a transverse rock-shaft 29, mounted in bearings in the upper portion of the boiler-casing. Each of the arms is formed at its lower end with an opening which receives a stud 30, projecting from the side of the plate 25, carrying the fulcrum-block. The arm 28 is provided with an angular extension 31, having a forked end, in which a nut 32 is mounted on a horizontal axis, and in this nut is screwed the rear end of a rotary shaft 33, extending horizontally forward to the front of the engine, where it is provided with a hand-wheel 34 for turning the same, the shaft being mounted at this point in a bearing 35, fixed to the frame, and of such construction as to permit the rotation of the shaft and prevent its endwise movement. By turning the hand-wheel the nut will be caused to move along the threaded end of the shaft, which action will rock the transverse shaft 29 and cause the lower ends of arms 28 and 28× to move upward or downward, thereby moving the fulcrum-blocks in their guiding-slots to or from the point of connection of the wheel-driving mechanisms with the rocking levers 19.

Under the construction described the movement of the fulcrum-blocks may be effected while the operative parts of the mechanism are in motion, the speed of the machine being increased as the fulcrum-blocks are moved downward and decreased as the blocks are moved upward toward the connection of the driving mechanism with the rocking levers. When the fulcrum-blocks are moved to a point coincident with the connection of the driving mechanism with the rocking lever, the latter will rock on this point as an axis and will not consequently impart motion to the driving connections, and the machine will be brought to a rest.

The driving mechanism for the wheels comprises two pairs of toggle-levers, one on each side of the machine. Each pair comprises two links 36, mounted loosely at one end on the bolt 26, carried by the rocking lever 19, while their opposite ends are pivoted to two links 37, which latter are in turn mounted loosely at their opposite ends on a collar 38, encircling the axle or shaft 5, before described. These collars are fixed to camplates 39 and are each formed with lugs and recesses adapted to interlock with corresponding lugs and recesses on two sleeves 40 and 41, which loosely encircle the axle and abut at their inner ends, where they are connected to operating-levers 42 and 43, as will be more fully described hereinafter.

From the construction described it will be observed that, assuming the fulcrum-block is adjusted to the position shown in Fig. 6, when the engine-shaft is rotated the rocking lever 19, through its connecting-pitman, will be oscillated and turning on the fulcrum-block as a center will carry the ends of the toggle-links 36 back and forth, thereby causing the links 37 to move alternately inward toward each other and then separate. This movement of the links 37 is utilized to drive the traction-wheels through the medium of clutches carried by the links now to be described. The traction-wheels are mounted on the projecting ends of the axle, and each is provided at its inner side, inward of its rim, with a laterally-extending flange 44, which is engaged by the clutches on the links and by which the wheels are rotated. These clutches are in the form of gripping-dogs 45, one fixed to each of the links. The dogs consist each of a plate having in its upper end an elongated slot mounted on a pin 46, projecting outward from the link. In its outer face the plate is formed with an open recess having oppositely-beveled walls 47 and 48, forming diametrically opposite points, between which walls the flange on the traction-wheel extends and is gripped when oscillated by the movement of the rocking lever. The lower or inner ends of the plates are forked, and in the forked end a spring-finger 49 extends, which fingers are fixed to elbow-levers 50, pivoted to the links near their ends. The function of these fingers is to adjust the dogs on their pivots from an inoperative position in line with the link, as shown in full lines in Fig. 6, to an operative position extending at an angle to the links, as shown in dotted lines in Fig. 6 and full lines in Fig. 7. The movement of the elbow-levers to effect this change in the position of the dogs is effected by means of the cam-plate 39, before alluded to, which is provided with cam-slots 51, in which pins 52, fixed to the respective elbow-levers, extend. These slots are of such form that by the movement of the cam-plate the dogs may be adjusted either to the position shown in Fig. 7, in which position, when the links are oscillated, the wheel will be driven in one direction to the position shown in full lines in Fig. 6, by which the wheel will remain at rest, or to the position shown by dotted lines in Fig. 6, by which the wheel will be driven in the opposite direction. The parts may be held in the different positions adjusted by means of locking-dogs 52ᵃ on the levers 42 and 43, adapted to engage three notches in segment-plates 53, fixed adjacent to the levers, the notches representing the three different positions to which the dogs are adjusted, as just described.

When the dogs are adjusted to the angular position represented in full lines in Fig. 1, they will grip the flange and move the wheel to advance the machine when the toggle-links move in a forward direction, as indicated by the arrow, the rearward movement of the links permitting the dogs to slip along the flange by reason of a slight yielding movement of the dogs toward an inoperative position on account of the spring-finger. By reason of the fact, therefore, that the links move in opposite directions to and from each other the flange will be gripped alternately by the dogs on the respective links, and a practically continuous movement of the wheel will be obtained. When the dogs are adjusted to the position shown in full lines in Fig. 6, both will slip along the flange as the links are oscillated and will have no effect on the wheel. Consequently the machine will remain at rest. When, on the other hand, the dogs are adjusted to the angular position shown in full lines in Fig. 7, the links will cause the dogs to grip the wheel when they are moved rearward, thereby causing the machine to reverse its direction and retreat. It is seen, therefore, that by the operation of the two levers 42 and 43 the machine may be caused to advance, remain at rest, or reverse its direction of motion, and this without interfering with the movement of the engine-shaft and its connected mechanism.

In order to quickly and conveniently control the direction in which the machine travels, I provide for turning on its vertical axis the swiveling truck which supports the rear end of the boiler. This is effected by means of a drum 55, journaled in suitable bearings 56 on the under side of the boiler about midway of its length. To this drum is connected a rope or chain 58, wound several times thereon, its ends being carried rearward and connected to the axle of the truck on opposite sides of its axis, as at 59. The drum is provided on one end with worm-wheel 60, engaged by a worm 61 on the rear end of a rotary shaft 62, which extends forward and upward along the side of the boiler to the front of the furnace, where it is provided with a suitable hand-wheel 62$^a$ for operating it. The shaft is mounted at its opposite ends in bearings 63 and 64. By turning the shaft in one direction the drum will be rotated and one end of the chain wound thereon and the other unwound, thereby turning the truck on its vertical axis and causing the front of the engine to diverge from a straight path.

To meet certain conditions encountered in practice, I propose to provide a brake for one or both of the traction-wheels. This brake may be conveniently constructed of the form shown in Fig. 1, consisting of a plate 65, pivoted at one end on a horizontal axis adjacent to the flange of the wheel and provided with gripping-fingers on its outer side, between which the flange extends. At its opposite end the plate has pivoted to it, on a horizontal axis, a nut 66, in which is screwed the lower end of a vertical shaft 67, mounted near its upper end in a bearing 68 and provided with a hand-wheel 69 for turning it. By operating this shaft the end of the plate may be raised or lowered, thereby causing the gripping-fingers to engage the sides of the flange with more or less friction, the fingers in this way serving as a brake for the wheel.

Having thus described my invention, what I claim is—

1. The combination with the wheel, of the clutch adapted to engage the same, a continuously-operating rocking lever, suitable connections between the clutch and the lever, a movable fulcrum on which the rocking lever rocks and means for moving and adjusting said fulcrum at will; whereby the stroke of the clutch may be varied to change the speed of the wheel.

2. The combination with the traction-wheel, of the driving-clutch adapted to engage the same, the continuously-operating rocking lever, the toggle-lever having one link connected to the clutch and the other link connected to the rocking lever and the fulcrum for the rocking lever adjustable to and from the point of connection of the toggle-link with said lever.

3. In a traction-engine the combination with the engine-shaft, of the rocking lever, the link connecting the same with the shaft, the traction-wheel, the clutch adapted to engage the same, the toggle-lever having one link connected to the clutch and the other link connected to the rocking lever and the movable fulcrum-block on which the rocking lever is mounted, said fulcrum-block being adjustable to and from the point of connection of the toggle-link with the lever.

4. The combination with the traction-wheel, of the two clutches adapted to engage and drive the same, the continuously-operating rocking lever, the two toggle-levers in the form of a quadrangle and each having one of its links connected to the clutches and its other links connected to the rocking lever, the movable fulcrum for the rocking lever, and means for adjusting said fulcrum to and from the point of connection of the links with the lever.

5. The combination with the traction-wheel, of the clutch for driving the same, the vibrating lever carrying the clutch, the continuously-operating rocking lever, the link connecting the vibrating lever with the rocking lever, the movable fulcrum for the rocking lever and means for adjusting the movable fulcrum in and out of line with the point of connection of the link with the rocking lever.

6. The combination with the rocking lever and driving-clutch operated thereby, of the movable fulcrum-block on which the lever is mounted, the elbow-lever joined at one end to said block, the nut pivoted to the other end of the lever and the rotary shaft mounted in bearings and screwed into said nut.

7. The combination with the traction-wheel provided with the lateral flange, of the clutch engaging said flange, the toggle-lever formed of two links pivoted together at their adjacent ends and one link pivoted at one end on the axis of the wheel and connected to the clutch and the other link movable to and from the axis of the wheel and means for moving said link as described.

8. The combination with the traction-wheel provided with the lateral flange, of the two toggle-levers mounted at one end on the axis of the wheel and having their opposite ends mounted on a common pivot, a reciprocating slide carrying said pivot, a fixed guideway in which the slide reciprocates to and from the axis of the wheel and clutches connected to said toggle-levers and engaging the flange on the wheel.

9. The combination with the wheel provided with the flange, of the arm or lever vibrating adjacent to the flange, the relatively movable clutch carried by said arm and formed with gripping-jaws between which the flange extends, a spring also carried by said vibrating arm or lever and acting on the clutch and holding it yieldingly in operative position, and means for adjusting and holding the clutch in different angular positions with relation to the lever.

10. The combination with the wheel provided with the flange, of the arm or lever vibrating adjacent to the flange, the clutch provided with gripping-jaws between which the flange extends, said clutch being pivoted to the lever, the spring also carried by said vibrating arm or lever and acting on the clutch and serving to hold it yieldingly in an operative position at an angle to the arm, and means for moving and holding said clutch at will, in line with or yieldingly at an angle to the arm.

11. The combination with the wheel provided with the flange of the vibrating lever adjacent to the same, the clutch formed with gripping-jaws embracing the flange and pivoted at one end to the lever, a pivoted spring-finger also carried by said vibrating lever and engaging the opposite end of the clutch and means for adjusting said finger to throw the clutch on its pivot to different positions with relation to the lever.

12. The combination with the wheel provided with the flange of the vibrating lever or arm adjacent to the same, the clutch formed with gripping-jaws embracing the flange, and pivoted at one end to the lever, the elbow-lever also pivoted to the arm and provided with a spring-finger engaging the clutch, a pin on the elbow-lever, a movable cam-plate provided with a slot to receive the pin, and means for moving said plate at will.

13. The combination with the wheel provided with the flange, of the two vibrating arms or levers adjacent thereto, the clutches pivoted at one end to said levers and provided with gripping-jaws embracing the flange, the elbow-levers pivoted to said arms, the springs fixed to said levers and engaging the free ends of the clutches, the pins on the elbow-levers, the cam-plate provided with the slots in which the pins engage and means for adjusting said plate.

14. The combination with the traction-wheel, of the toggle-levers pivoted on its axis, and mounted at their opposite ends to move to and from the axis of the wheel, the clutches pivoted at one end on one of the links of the levers and provided with gripping-jaws between which the flanges extend, elbow-levers pivoted to the links, spring-fingers connected to the elbow-levers and engaging the clutches, the pins on said elbow-levers, the cam-plate provided with slots in which the pins extend, the sleeve encircling the axis of the wheel and connected to said cam-plate and the adjusting-lever connected to said sleeve.

15. The combination with the traction-wheel provided with the flange, of the driving-clutch engaging the same, the movable brake-lever provided with gripping-jaws between which the flange extends and means for moving said lever to cause the jaws to engage the opposite sides of the flange.

16. The combination with the traction-wheel provided with the flange, of the driving-clutch engaging the same, the brake-lever pivoted at one end and provided with gripping-jaws between which the flange extends, the nut pivoted to the opposite end of the lever and the rotary shaft mounted in fixed bearings and screwed into said nut.

17. The combination with the traction-wheel and the clutch for driving the same, of a T-shaped frame comprising a diagonally-extending slotted base-piece, a slotted plate extending at right angles from the middle of the slotted base, a rocking lever operated from the engine-shaft and extending between the slotted base and plate, a reciprocating slide in the base-slot, a pin connecting said lever and slide, links connecting the slide with the wheel-operating clutch; the said rocking lever having in its opposite side a longitudinal dovetail groove, a fulcrum-block mounted in the said lever-groove and turning loosely on a laterally-extending journal which forms the fulcrum of the rocking lever, and projects through the slotted frame-plate, an adjusting-arm connected to said journal or fulcrum to move said fulcrum-block up or down, substantially as set forth.

In testimony whereof I hereunto set my hand, this 2d day of March, 1896, in the presence of two attesting witnesses.

ANDREW J. MARTIN.

Witnesses:
F. R. KEATING,
ROGER C. ADAMS.